United States Patent [19]
Franz

[11] 3,774,676
[45] Nov. 27, 1973

[54] AUTOMOTIVE VEHICLE AUTOMATIC TEMPERATURE CONTROL SYSTEM

[75] Inventor: Rudolph J. Franz, Schaumburg, Ill.
[73] Assignee: Eaton Corporation, Cleveland, Ohio
[22] Filed: Mar. 28, 1972
[21] Appl. No.: 238,838

[52] U.S. Cl. .................................... 165/23, 165/42
[51] Int. Cl. ............................................. B60h 3/04
[58] Field of Search .......................... 165/23, 41–44

[56] References Cited
UNITED STATES PATENTS
3,315,730    4/1967    Weaver et al. ..................... 165/23

Primary Examiner—Charles Sukalo
Attorney—Carlton Hill et al.

[57] ABSTRACT

Automatic temperature control system for the passenger compartment of an automotive vehicle. The control is by vacuum modulated by the temperature of ambient air and the temperature of air in the passenger compartment of the vehicle and includes a vacuum motor operated by modulated vacuum regulating the position of a plenum mounted air blend door, controlling the passage of cold, tempered or heated air into the passenger compartment and positioning an electrical programmer, to provide the desired blower speeds and certain program functions of the system.

18 Claims, 5 Drawing Figures

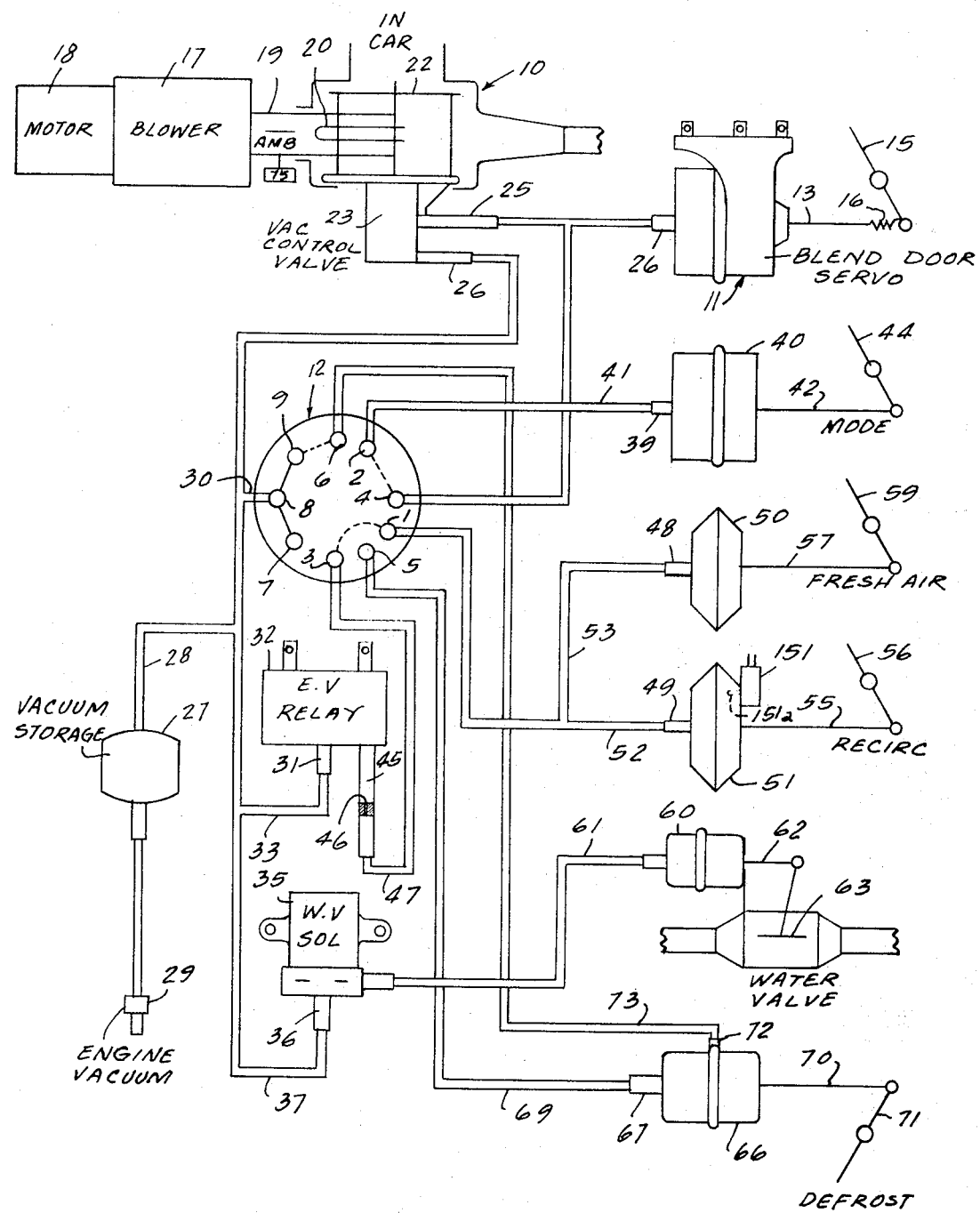

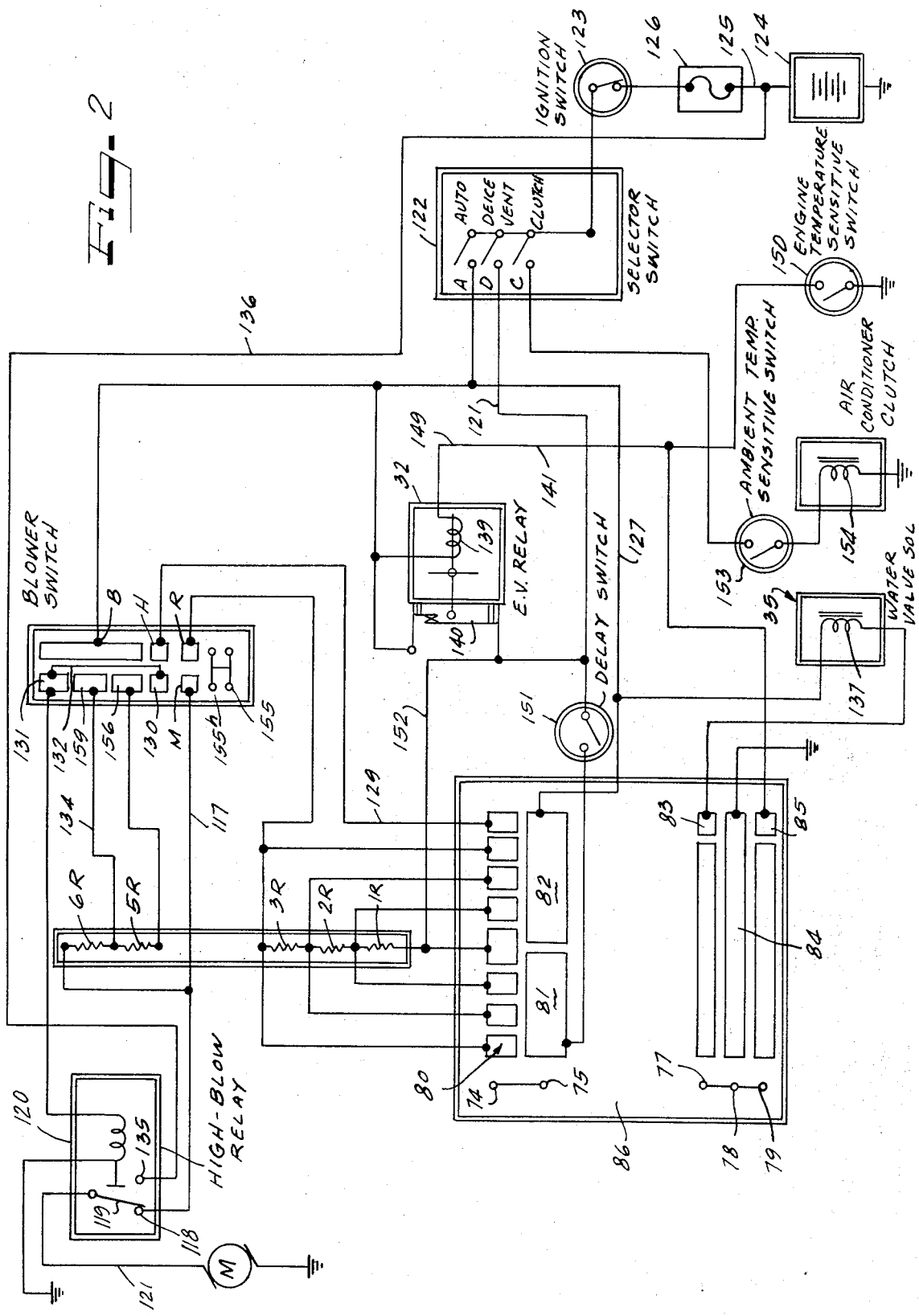

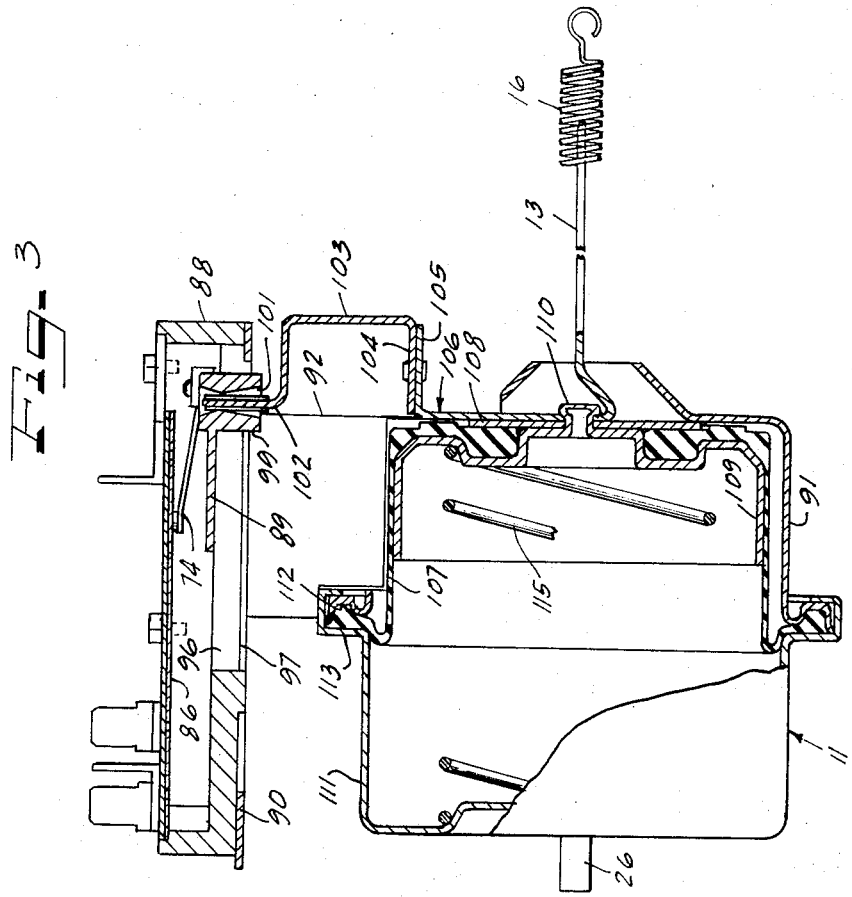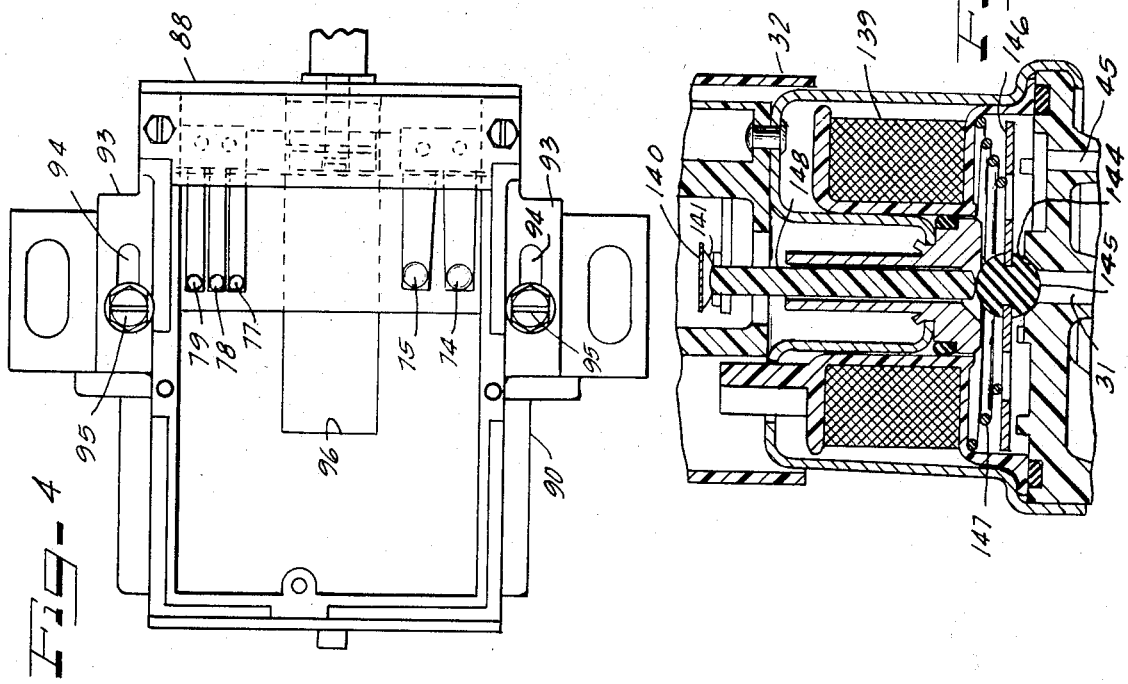

AUTOMOTIVE VEHICLE AUTOMATIC TEMPERATURE CONTROL SYSTEM

FIELD OF THE INVENTION

Automatic temperature control for the passenger compartment of an automotive vehicle of the type coming under Classes 165 and 237.

BACKGROUND, SUMMARY AND ADVANTAGES OF INVENTION

This invention is an improvement in the automotive temperature control systems disclosed in the U.S. Pat. No. to Freiberger 3,433, 130; Templin et al. 3,460,754 and Gaskill et al. 3,263,739 in the simplification and efficiency of the control by the provision of a vacuum operated servo motor operated by modified in-car and ambient temperatures and connected to operate the air blend door of the system directing the air, which has previously passed through the evaporator coil, to either flow through the heater core for reheating or to bypass the heater core for proper air distribution or to flow solely through the heater core. The electrical programmer for the system is positioned by the vacuum motor in accordance with ambient and in-car temperature conditions and the position of the air blend door, and positively shuts off the hot water valve where maximum air conditioning is required, and has an electro-vacuum relay energized through the programmer and operable to keep the outside air door closed and the blower off, when the engine is cold and until a preselected temperature of the engine is attained, as well as to keep the outside air door closed when maximum heating is required.

The system further provides a low blow purge effective to purge the plenum of stale air as the fresh air door is closed and the recirculation door opens to recirculate heated air through the passenger compartment. The control of the electrical and pneumatic components controlled by the programmer has provisions for overriding either the pneumatic or electrical circuitry where full circulation of air and changes in the sequence of operation of the various air circulation ducts are required.

An advantage of the invention is the simplification of the system and more positive and selective control in accordance with temperature conditions, by the provision of a servo motor operated by vacuum modulated in accordance with in-car and ambient temperatures and operating an electrical programmer forming a part thereof, carrying out the program of operation of the system in accordance with the temperature conditions and shutting off the hot water valve upon extreme high temperature conditions, as the air blend door reaches the end of its travel to provide conditioned air to the system upon overtravel of the servo motor relative to the air blend door.

A further advantage of the invention is the deenergization of the blower motor when the engine is cold and heat is required until the engine temperature reaches a preselected value and the holding of the air recirculation duct closed, to prevent cold fresh air from entering the passenger compartment of the automotive vehicle until the temperature of the coolant rises to the extent required to heat the air to a comfortable temperature, together with a low speed blower purge effective to purge the plenum of stale air prior to cycling of the blower at its required blower speeds.

Another advantage of the invention is that the heating and cooling of the vehicle may be automatically controlled by vacuum modulated in accordance with in-car and ambient temperatures, and the program for heating and cooling is in accordance with the position of the air blend door of the air conditioning system.

A further advantage of the invention is in the simplicity and efficiency of the system and the provision for manually overriding the programming of the blower motor and the pneumatic and electric circuitry at the selection of the operator.

Other objects, features and advantages of the invention will be more readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a schematic view illustrating the vacuum controls and motors for an automotive heating and cooling system constructed in accordance with the principles of the present invention.

FIG. 2 is a diagrammatic view illustrating the electrical programmer and controls for the system cooperating with the vacuum controls.

FIG. 3 is a partial fragmentary longitudinal sectional view taken through the power servo and programmer of the present invention.

FIG. 4 is a top plan view of the programmer shown in FIG. 1 with the contact plate removed; and FIG. 5 is a fragmentary transverse sectional view taken through the form of electro-vacuum relay utilized in the present invention with certain parts removed and certain other parts broken away.

DESCRIPTION OF A PREFERRED EMBODIMENT OF INVENTION

In FIG. 1 of the drawings, the vacuum components of an automatic temperature control system are shown in diagrammatic form as including a temperature sensor and vacuum modulating valve 10 of a type shown and described in my U.S. Pat. application Ser. No. 71,765, filed on Sept. 14, 1970 and entitled "Temperature Control System and Vacuum Modulator Valve Therefor" shown as supplying modulated vacuum to a vacuum servo motor 11 and to a vacuum selector 12, which may be a rotary selector of a type wellknown to those skilled in the art so not herein shown or described in detail. The vacuum motor 11 has a plunger 13 extending therefrom having connection with an air blend door 15 through a tension spring 16 serving as an overtravel spring accommodating retractable movement of the plunger relative to the air blend door, when the air blend door is in a maximum air conditioning position.

A blower 17 driven by a blower motor 18 is provided to blow air at ambient temperature through a duct 19 of the sensor and vacuum modulating valve 10 along an ambient bimetal element 20. The ambient air duct 19 terminates into a reduced cross-sectional area discharge end, and draws air through an in-car duct 21 along an in-car bimetal element 22. The ambient bimetal element 20 and in-car bimetal element 22 are connected to operate a vacuum control valve 23 modulating vacuum in accordance with in-car and ambient temperature requirements. The vacuum modulator valve 23 has a vacuum output 24 connected with manifold or source vacuum, which draws vacuum modulated in accordance with temperature conditions into the valve through a vacuum input 25 connected with a vacuum output 26 of the vacuum motor 11, in the manner shown and described in my prior application Serial No.

The vacuum output 24 is connected with a vacuum storage tank 27 through a vacuum line 28. Said storage tank is connected with engine vacuum, as for example, the intake manifold of an internal combustion engine (not shown) through a connector fitting 29 which may be threaded within or otherwise connected in the manifold. A vacuum output 30 of the selector 12 is connected with the vacuum line 28 and connects ports 7, 8 and 9 of said selector to vacuum. A vacuum output 31 of an electro-vacuum relay 32 is also connected with source vacuum through a vacuum line 33.

A vacuum operated water valve solenoid 35 has a vacuum output 36 connected with source vacuum through a vacuum line 37.

When the vacuum selector 12 is in an automatic position, a port 4 of the vacuum selector connected with modulated vacuum has connection with a port 2 of the selector which is connected with a vacuum output 39 of a servo vacuum motor 40 through a vacuum line 41. The servo vacuum motor 40 has a plunger 42 extending therefrom and retractable with respect to said motor upon predetermined increases in vacuum, and connected at its outer end to a mode door 44. Said mode door 44 controls the circulation of the air and smoothly distributes air smoothly simultaneously from the instrument panel and floor registers during a transition from heat to air conditioning mode and vice versa and positions the door to distribute air through the panel during cooling by the air conditioner and through the floor during heating.

The electro-vacuum relay 32 has a vacuum input 45 having a restriction 46 therein connected. A vacuum line 47 connects said vacuum input 45 with a port 3 of the selector 12. Said electro-vacuum relay is shown in FIG. 5 and will hereinafter be more fully described as this specification proceeds.

When the selector 12 is in its automatic position, the port 3 has communication with the port 1 having communication with the vacuum outputs 48 and 49 of vacuum motors 50 and 51, respectively, through a vacuum line 52 and a branch vacuum line 53. The vacuum motor 51 has a plunger or operator 55 connected with a recirculation door 56 for moving said door from an open to closed position upon retractable movement of the plunger 55, to effect the recirculation of either heated or cooled air through the passenger compartment of the vehicle, for maximum heating and cooling conditions. The vacuum motor 50 has a plunger or operator 57 retractable therein upon the connection of the vacuum output 48 to source vacuum through the electrovacuum relay 32, for opening a fresh air door 59 as the recirculation door 56 is closed to accommodate the circulation of fresh air through the passenger compartment during heating, cooling or venting of the passenger compartment. The electro-vacuum relay 32 is adapted to keep the fresh air door closed and the system off until a specific coolant temperature is attained, as well as to keep the fresh air door closed when maximum cooling is required under control of the programming circuit as will hereinafter more clearly appear as this specification proceeds.

The water valve solenoid 35 and valve controlled thereby are under the control of the electrical programming circuit and may be a conventional form of solenoid and valve open upon deenergization of the solenoid, so need not herein be shown or described in detail. The valve of the vacuum water valve solenoid 35 has connection with a water valve vacuum motor 60 through a vacuum line 61. The vacuum motor 60 has a plunger 62, retractable with respect to said motor upon the connection of said motor to source vacuum through the water valve and a vacuum line 37. The plunger 62 is diagrammatically shown as having operative connection with a water valve 63. The water valve 63 may be of any conventional form and is in its wide open position upon deenergization of the water valve solenoid. The plunger 62 is biased to close said water valve upon energization of said solenoid under the control of the servo programmer (FIG. 2) actuated by the servo motor 11.

A defrost or defog vacuum motor 66 has a vacuum output 67 connected with the selector 12 through a vacuum line 69 connected with a port 5 of said selector. The defrost vacuum motor may be of a type having dual diaphragms, in which one diaphragm retractable moves a plunger 70 of said vacuum motor a predetermined distance to move an air circulation door 71 operated by said plunger one half of its travel upon setting of the vacuum selector in a defog position, to connect the vacuum line 69 to source vacuum. The vacuum motor 66 also has a second vacuum output 72 connected with a port 6 of the selector 12 through a vacuum line 73 and thereby moving the door 71 to its full defrost or deice position to send a maximum amount of hot air over the windshield and windows where provision may be made by appropriate ducts to defrost the side windows as well as the rear window.

Referring now in particular to FIGS. 2, 3, 4 and 5, and the programming circuit providing the desired automatic blower speeds together with the necessary program functions, the servo motor 11 has an electrical programmer as a part thereof and operated in accordance with modulated vacuum in the chamber for the motor. The programmer is shown in FIGS. 3 and 4 as a sliding type of switch having a series of sliding contact fingers 74, 75, 77, 78 and 79 movable along stationary contacts 80, 81, 82, 83, 84 and 85, respectively, diagrammatically shown in FIG. 2 as extending along a stationary contact plate 86. The contact plate 86 forms a top cover for a programmer housing 88 and is suitably secured thereto (FIG. 3). The stationary contacts 80 to 85 face downwardly and are slidably engaged by the sliding contact fingers 74, 75 and 77, 78 and 79, carried on an insulated slide plate 89, slidably guided in the programmer housing 88 to cut resistors into and out of the circuit to the blower motor 18 and to thereby operate said blower motor at its 4 automatic blower speeds and also to control certain programmed operations of the system.

The programmer housing 88 is mounted on a plate 90, which may be a metal plate and is mounted on a casing part 91 of the servo motor, between a pair of upright arms 92, which may be formed integrally with said plate. The programmer housing in turn is provided with aligned laterally extending ears 93 having slots 94 therein, through which machine screws 95 pass. The machine screws 95 may be threaded in the plate 90 and afford a means for adjusting the position of the contact plate 86 relative to the contact fingers 74,75 and 77,78 and 79, to vary the timing of the programming operation and to thereby enable the contact plate 86 to be positioned to carry out the control functions at the proper time.

The bottom of the programmer housing 88 has a slot 96 extending therealong registering with a slot 97 formed in the plate 90, and receiving a slotted drive ear 99 extending downwardly from the insulated slide plate 89 for the contact fingers 74,75 and 77,78 and 79 and extending beneath the plate 90. The drive ear 99 has a slot 101 extending therealong having facing walls converging from opposite ends thereof to provide peaked engaging faces providing line engagement with an upright driver arm 102, connected with the plunger 13 to be moved thereby.

The upright driver arm 102 has a U-shaped lower end portion 103, the base of which is spaced away from the casing part 91. Said U-shaped lower end portion has an inwardly extending leg 104 riveted or otherwise secured to a horizontal leg 105 of an angle 106 and accommodates movement of the arm 102 along the casing part 91. The vertical leg of the angle 106 extends downwardly along the outside of a diaphragm 107 to and beneath the center thereof along the outside of a diaphragm plate 108 extending along the outside of said diaphragm. An internal diaphragm reinforcement 109 of a generally cup-like form, abuts the inner end and sides of the diaphragm when the plunger 13 is in its extended position. The vertical leg of the angle 106 may be formed integrally with the plunger 13 and is riveted to the plate 108 and the base of the cup-like diaphragm reinforcement 109 by a rivet 110. The end wall and top portion of the cylindrical wall portion of the casing part 91 are slotted to accommodate the horizontal leg 105 to extend from said casing part and to accommodate full retractable movement of the diaphragm 107 and the plunger 13.

The casing part 91 is abutted by a casing part 111 and has an outward extending radial flange having a sealing groove 112 extending thereabout, and affording a means for sealing the diaphragm to the casing parts 91 and 111. The casing part 111 has a radial flanged portion 113 crimped about the radial flange of the casing part 91 in a conventional manner. A compression spring 115 is provided to bias the diaphragm 107 and plunger 13 in the extended position shown in FIG. 3.

The stationary contacts 80 on the contact plate 86 comprise a series of spaced contacts successively engaged by the contact finger 74 as the power servo motor is operated by vacuum modulated by the ambient and in-car temperature sensitive elements 20 and 22, respectively. In FIG. 2 of the drawings the contact fingers 74,75 and 77,78 and 79 may move from the left to the right hand side of the contact plate 86 during the heat mode, to first energize the blower at a high blower speed and successively reduce the blower speed to its fourth or lowest speed as the contact finger engages the center contact of the contacts 80. The first contact 80 on the left hand side of the contact plate 86 establishes a direct energizing circuit to the blower motor 18 through contacts R and M of a blower switch 116, a conductor 117, a contact 118 and switch arm 119 of a high speed blower relay 120 and a conductor 121 leading from the switch arm 119 to the blower motor 18. This provides the high blower speed required to warm up the passenger compartment of the vehicle.

It should here be understood that the contacts R and M are electrically connected by sliding contacts 155. These contacts include contacts 155 electrically connected together and two other contacts 155h electrically connected together and insulated from the contacts 155. As the contact finger 74 moves to the right, the successive contacts engaged thereby will cut resistance 3R, 2R and 1R into the blower motor circuit.

The contact 81 is energized through a delay switch 151, an electrovacuum relay switch 140 and a contact A of a selector 122 connected to battery 124 through an ignition switch 123 and conductor 125. A fuse 126 is shown as being in the conductor 125. The contact 81 is energized during the heating cycle only.

When the temperature of the passenger compartment rises to the extent that air conditioning is required, the slide 89 will have moved along the programmer housing 88 to engage the contact finger 74 with the contact 80 connected with the blower motor 18 through the three resistors 1R,2R and 3R. Current will be supplied to the contact finger 74 through the contact finger 76 engaging the contact 82. Said contact 82 controls the blower speeds during the cooling cycle. As the temperature within the vehicle increases with a corresponding increase in ambient temperature, the contact finger 74 will cut out the resistors 1R,2R and 3R from the blower motor circuit and increase the blower speed to a high blower speed, with all of the resistance cut out of the motor circuit as the contact finger 74 contacts the next to the last contact 80. The last contact 80 is provided to energize the blower motor at high blower speed upon overtravel of the servo motor 11. The contact 82 is energized through contact A of the selector switch 122 through a conductor 127. When the contact finger 74 engages the next to the last contact 80, the air blend door 15 will be in its maximum air conditioning position. As the temperature increases, however, overtravel of the diaphragm 107 and plunger 13 will take place against the tension spring 16. The contact finger 74 will then engage the last contact 80 on the contact plate. An energizing circuit is complete to the blower motor 18 through a conductor 129 connected with a contact H of the blower switch. The contact H has energizing connection with a contact 130 through the slide contacts 155h. The contact 130 is connected with a contact 131 of the blower switch through a conductor 132. The contact 131 in turn is connected with a relay coil 133 of the high blow relay 120 through a conductor 134. This will energize said relay coil and engage the switch arm 119 with a contact 135 of said relay. The blower motor will then be directly connected with the battery 124 through a conductor 136 and the blower will be driven at a high blower speed when maximum cooling is required.

In this position of the contact fingers 74 and 75, the contact finger 77 will engage a contact 83. This will complete an energizing circuit to a solenoid coil 137 for the water valve solenoid 35, and open the water valve (not shown) of said water valve solenoid and connect the servo motor 60 to source vacuum. This will effect movement of the water valve 71 to a closed position and hold the valve in such a position. The flow of water to the heater coil (not shown) will thus be shut off when maximum cooling is required. As the contact finger 77 engages the contact 83, a contact finger 79 electrically connected with the contact fingers 77 and 78 will engage the contact 85 and energize a solenoid coil 139 of the electro-vacuum relay 32 and open contacts 140 of the relay switch 141. Energization of the solenoid coil 139 will also open a valve 145 of the relay 32, and effect the connection of the servo motors 50 and 51 to the source of vacuum to close the fresh air door 59 and open the recirculating door 56 to recirculate cooled air through the passenger compartment of the vehicle.

The electro-vacuum relay 32 as shown in FIG. 5 is of a type operating on principles somewhat similar to the valve shown and described in an application U.S. Pat. Ser. No. 195,239 filed by Rudolph J. Franz, John S. Freismuth and Lena Benedetti on Nov. 3, 1971 and entitled "Emissions Reduction Vacuum Control Valve," so need only be generally referred to herein.

As shown in FIGS. 1 and 5, the vacuum output 31 is connected with source vacuum through the vacuum line 33. Said vacuum output 31 has a valve seat 144 forming a seat for a resilient ball-type valve 145. The valve 145 is carried at the center of an armature plate 146. A conical spring 147 engages said armature plate and biases the valve 145 in a closed position. Energization of the solenoid coil 139 moves the armature plate 146 and valve 145 in a direction to open said valve. Source vacuum will then draw vacuum through the vacuum input 45 through a restriction 46 in said vacuum input and out through the vacuum output 31. This will connect the motors 50 and 51 to source vacuum through the selector 12 and close the fresh air door 59 and open the recirculating door to recirculate cooled air through the vehicle.

The ball valve 145 is engaged by a plunger 148, which in turn engages a movable contact 141 on the switch arm 140 to open the circuit through the relay as the solenoid coil 139 is energized. The switch arm 140 is biased to close a circuit to the blower motor 18 upon deenergization of the solenoid coil 139, at which time the valve 145 will close and block the flow of vacuum into the valve through the vacuum input 45 and out through the vacuum output 31.

The solenoid coil 139 of the electro-vacuum relay 32 is energized through a conductor 149 connected with ground through a thermally responsive engine switch 150. The engine switch 150 may be a bimetallic temperature sensing switch, which is closed when cold and opens to deenergizing the solenoid coil 139 when the engine coolant reaches a comfortable circulating temperature, as between 120° to 140° F.

As the switch 150 is closed, the solenoid coil 139 will be energized to open the valve 145 and connect the fresh air vacuum motor 15 and the recirculating vacuum motor 51 to source vacuum through the vacuum intput 45 and the bleed passageway or restriction 46. This will delay opening of the recirculating door and thereby prevent cold air from entering the passenger compartment. This delay is dependent on engine size and will take anywhere from 1 to 5 minutes. Energization of the solenoid coil 139 will move the contact arm 140 to break the circuit to the blower motor 18, and thereby keep cold air from being blown into the passenger compartment until the engine warms up.

Referring now to the low blow purge of the system, the recirculating servo motor 51 is shown in FIG. 1 as having the delay switch 151 carried thereon. Said delay switch 151 may be a form of limit switch actuated by a plunger 151a biased into engagement with the diaphragm (not shown) of the servo motor 51. Said plunger 151a closes said switch to establish an energizing circuit to the contact 81 after the relay switch 140 has closed, in a manner well known to those skilled in the art, so not shown or described in detail herein.

The delay switch 151 closes in a predetermined time delay of between ten and fifteen seconds after closing of the contacts of the relay switch 140. Thus, as the engine warms up and the temperature sensitive switch 150 opens, the delay switch 151 will be open. The blower motor 18 will then be energized through the relay switch 140, a conductor 152 and the resistors 1R,2R and 3R. This will effect a low blow purge of the plenum of stored air prior to operating the blower at its high blower speed, through contact 81, contact fingers 75 and 74 and the first stationary contact 80 at the left hand side of FIG. 2, as previously described.

The system also includes an ambient thermally responsive switch 153 in the circuit to a solenoid coil 154 when said selector is in its automatic or deice position, energized through the selector 122 to effect engagement of the compressor clutch whenever the ambient temperature is above a predetermined low temperature, which may be in the order of 40°. An override for the ambient switch 153 (not shown) may be provided where it may be desired to override the ambient switch above or below the temperatre of closing of the temperature sensitive ambient switch 153.

The sliding contacts 155 movable along the blower switch 116 are normally in position to complete a circuit through contacts R and M. The contacts 155 and 155h may also be manually moved along said blower switch to complete a circuit between the contact B of the blower switch and a contact 156, connecting the blower in the circuit through a conductor 157 and resistors 5R and 6R. The contacts 155 may also be moved to complete a circuit between the contact B and a contact 159 and effect energization of the blower motor 18 at a higher speed through the resistor 6R. Further movement of the sliding contacts may also complete a circuit between the contact B and the contact 131 and energize the solenoid coil 133 and complete a circuit between the contact 135 and contact arm 119 and the conductor 136 connected to the battery 124 through the conductor 123. The blower switch 116 thus provides three manually controlled blower speeds to override the four programmed automatic blower speeds.

When the system is to be automatically controlled the selectors 12 and 122 may be set in an automatic position. If the ambient temperature is below 40° the ambient switch 153 will be open and the compression clutch will be deenergized. If the engine coolant is cold, the temperature sensitive engine switch 150 will be closed. The solenoid coil 139 will then be energized and the swtich arm 140 will move to its open position. This will open the valve 145 and connect the servo motors 50 and 51 to a source of vacuum through the selector 12 and the bleed orifice 46. The blower circuit will then be broken and the recirculating door will be kept in a recirculating position. The delay switch 151 will also be open.

As the engine coolant temperature reaches a temperature of between 120° and 140° F., the temperature sensitive switch 150 will open to deenergize the solenoid coil 139. The blower motor 18 will then operate at a low blow purge speed through the switch arm 140, a conductor 152 and resistors 1R, 2R and 3R. This will purge the plenum of stored stale air.

As the recirculating door 56 closes and the fresh air door 59 opens, the delay switch 151 will close and complete an energizing circuit through the switch arm 140 to the contact 81, through said delay switch 151. This will energize the blower motor 18 to drive the blower motor 18 at a high blower speed. As the passenger compartment warms up, the resistors 3R, 2R and 1R will be cut into the circuit under the control of the ambient and in-car temperature sensing elements 20 and 22 respectively, the servo motor 11 and programmer operated thereby.

As the ambient temperature reaches a temperature of 40°, The switch 153 will close to energize the solenoid coil 154 to connect the compressor (not shown) to the engine, to be driven thereby.

The selector 12 will also connect the mode servo motor 40 to a source of modulated vacuum to move the mode door from heating to bi-level to air conditioning and provide a continuous modulation of discharge air from floor to bi-level to the instrument panel, in accordance with the requirements for heated or cooled air as determined by the sensor 10.

When cooling is required, the servo motor 11 moving the programmer in accordance with modulated vacuum, determined by the sensor 10 will energize the contact 82 directly connected with contact A of the selector switch 122 and will selectively cut the resistors 1R, 2R and 3R out of the blower motor circuit as the air blend door 15 reaches the end of its travel in an air conditioning position. The overtravel spring 16 will accommodate continued retractable movement of the servo motor 11 and plunger 13, and engage the contact finger 74 with the last contact 80 on the contact plate 86. This will override the contacts R and M of the manual blower switch and directly connect the blower motor 18 to battery 124, to drive the blower 18 at a high blower speed.

The contact fingers 77 will also engage the contact 83 and effect energization of the water valve solenoid. This will shut off the flow of hot water through the heater coil. The contact finger 79 will also engage the contact 85, and energize the solenoid coil 139 and open the valve 145 and the switch arm 140 of the relay 32. The servo motors 50 and 51 will now be connected to source vacuum through the programmer 12 and vacuum input 45 of the electro vacuum relay and close the fresh air door and place the recirculating door in its recirculating position and the delay switch 151 will open. Air in the car will be recirculated by the blower 18 driven at a high blower speed through the conductor 136, directly connected to the battery 124.

It should here be understood that during automatic heating and air conditioning the auto and clutch switches of the selector 122 are closed. The deice vent switch is open.

When it is desired to turn the system to vent, the auto and vent deice switches are turned on while the clutch switch is turned off.

In order to deice, the auto, cluch and vent deice switches are turned on while when the selector 122 is in its defog position, the auto and clutch switches are on and the vent deice switch is turned off. In both of these operations, the selector 12 is turned to defog and deice positions to effect partial or full movement of the door 71.

It should further be understood that the selector 12 may override the automatic program functions and change the operation of the air circulating doors as required in accordance with the type of conditioning or deicing or defoging operation that is required to be performed.

I claim as my invention:

1. In an automotive vehicle automatic temperature control system of the type including a heater core, an evaporator, a condenser, compressor and a clutch connecting the compressor to the engine of the automotive vehicle,
   a source of vacuum,
   a temperature sensor connected with said source of vacuum and sensing in-car and ambient air temperature and modulating source vacuum in accordance with temperature requirements,
   a vacuum selector having at least an automatic and a vent position,
   a vacuum connection from said source of vacuum to said vacuum selector,
   a vacuum connection from said sensor to said vacuum selector,
   a power servo vacuum motor,
   an air blend door operated thereby controlling the admission of heated air, cooled air and blended heated and cooled air into the passenger compartment of the vehicle,
   a vacuum connection from said sensor to said power servo vacuum motor connecting said motor to modulated vacuum,
   a blower,
   a blower motor, operable to drive said blower to force heated and cooled air into the passenger compartment of the vehicle,
   a programmer operated by said servo motor,
   said programmer completing electrical connections to said blower motor for varying the speed of said blower motor in accordance with temperature requirements and the position of said vacuum power servo and said air blend door, 2. The automatic temperature control system of claim 1,
   wherein the energizing circuit to said blower motor includes,
   a relay having normally closed contacts,
   a solenoid coil operable to open said contacts,
   an energizing circuit to said solenoid coil including a temperature sensitive switch sensitive to engine temperature and closing when the engine is cold and energizing said solenoid coil to deenergize said blower and hold said blower motor deenergized until opening of said temperature sensitive switch upon elevated engine coolant temperature conditions.

3. The automatic temperature control system of claim 2, including
   two servo motors connected in parallel,
   a fresh air door operated by one of said motors,
   a reciruclting air door operated by the other of said motors alternately of operation of said fresh air door,
   wherein the relay is an electro-vacuum relay,
   wherein a vacuum connection is provided from source vacuum to said relay and another vacuum connection is provided from said relay to said two power servo vacuum motors in parallel, for effecting closing of said recirculation door and opening of said fresh air door upon energization of said solenoid coil.

4. The automatic temperature control system of claim 3, in which the parallel vacuum connection from said electro-vacuum relay to said vacuum motors includes,
a vacuum input having vacuum connection with said two motors,
a bleed passage bleeding vacuum connected with said vacuum input and delaying closing of said recirculation door and opening of said fresh air door for a predetermined time interval when the engine is cold, to accommodate the purging of stored air prior to the circulation of fresh air into the passenger compartment of the vehicle.

5. The automatic temperature control system of claim 4, including
a series of resistors connected in series between said programmer and said blower motor,
a time delay switch operated by said servo motor closing said recirculation door and closed upon closing of said door, to complete a circuit from said relay to said programmer,
and an electrical connection directly connecting said relay to said blower motor through said resistors for energizing said blower motor at a low speed to purge the system for a predetermined time interval during engine warm-up.

6. The automatic temperature control system of claim 5,
wherein the electro-vacuum relay includes a valve controlling the passage of vacuum from said bleed orifice to the source of vacuum, and
wherein said valve is opened upon energization of said solenoid coil to delay closing of said recirculation door and opening of said fresh air door for a predetermined delayed time interval during engine warm-up.

7. The automatic temperature control system of claim 1, including,
a water valve controlling the passage of hot water to the heater core for the vehicle,
electrical energizable means controlling the opening and closing of said water valve,
and an energizing circuit from said programmer to said electrical energizable means energizable to connect said vacuum motor to a source of vacuum, to shut off said water valve and the supply of water to the heater core upon extreme travel of said first mentioned vacuum servo motor and programmer operated thereby where maximum cooling is required.

8. The automatic temperature control system of claim 7, including,
a vacuum motor for operating said water valve,
a connection from the source of vacuum to said vacuum motor,
and wherein the electrical energizable means includes a solenoid controlled valve connected in the energizing circuit from said programmer and energized upon extreme travel of said servo vacuum motor and programmer for maximum cooling conditions.

9. The automatic temperature control system of claim 5,
wherein the time delay switch is carried by said servo motor closing said recirculation door,
wherein an operative connection is provided between said switch and said servo motor for closing said switch upon closing of said recirculation door and opening of said fresh air door, to provide an energizing circuit to said blower motor through said relay and said time delay switch as the engine has warmed up.

10. The automatic temperature control system of claim 9, including an energizing circuit to said blower through said relay and said resistors for bypassing said time delay switch upon closing of said relay, as said recirculation door remains closed and said time delay switch is open to drive the motor at a low blower speed and purge the system of stored air.

11. The automatic temperature control system of claim 10, including,
a water valve controlling the passage of water to the heater core for the vehicle,
a connection from the source of vacuum to said water valve including a vacuum control valve and a solenoid operable to open said valve,
an energizing circuit from said programmer to said solenoid for energizing said solenoid and effecting opening of said vacuum control valve and closing of said water valve upon extreme travel of said servo motor and programmer into a maximum cooling position.

12. The automatic temperature control system of claim 1, including,
a second power servo vacuum motor, said vacuum selector being positionable to connect said second power servo vacuum motor to modu'ated vacuum, modulated by said temperature sensor when in an automatic position,
a mode door operated by said second power servo vacuum motor to provide a continuous modulation of air discharged by said blower from floor to bi-level to panel and from heating to cooling.

13. The automatic temperature control system of claim 12, including,
two additional power servo vacuum motors connected in parallel,
a fresh air door operated by one of said additional power servo vacuum motors,
a recirculation door operated by the other of said additional power servo vacuum motors alternately of operation of said fresh air door to close as said fresh air door opens and vice versa,
an electro-vacuum relay,
a vacuum connection is from source vacuum to said relay and another vacuum connection from said relay to said two additional power servo vacuum motors,
said electro-vacuum relay including a solenoid coil and contacts normally closed and opening upon energization of said solenoid coil,
an energizing circuit for said solenoid coil and including a temperature sensitive switch sensitive to engine temperature and closed when the engine is cold, and energizing said solenoid coil to open its contacts and prevent energization of said blower motor, and holding said blower motor deenergized until opening of said temperature switch upon elevated engine coolant temperature conditions, energization of said solenoid coil also opening said electro-vacuum relay valve, to connect said power servo motors to source vacuum in parallel, to effect closing of said recirculating door and opening of said fresh air door as the coolant temperature reaches a predetermined comfortable temperature level, said temperature sensitive switch opening upon elevated engine coolant temperatures to deenergize said solenoid coil and effect closing of said relay contacts and closing of said electro-vacuum relay valve and heating of the passenger compartment under control of said programmer.

14. The automatic temperature control system of claim 13, in which the vacuum connection from said electro-vacuum relay to said vacuum motors connected in parallel, includes,
a vacuum input for said electro-vacuum relay and
a bleed passageway in said input delaying closing of said recirculation door and opening of said fresh air door for a predetermined time interval upon cold engine coolant conditions.

15. In an automotive vehicle automatic temperature control system of the type having a heater core, an evaporator, a condenser, a compressor, and a clutch connecting the compressor to the engine of the automotive vehicle,
a source of vacuum,
a blower,
a blower motor, operable to drive said blower to force heated and cooled air into the passenger compartment of the vehicle,
a programmer,
a plurality of resistors connected in series,
said programmer connecting said blower motor in an electrical energizing circuit through said resistors, and cutting said resistors out of the circuit, for varying the speed of said motor in accordance with temperature requirements,
a relay having normally closed contacts,
a solenoid coil for opening said contacts when energized,
an energizing circuit to said solenoid coil including a temperature sensitive switch sensitive to engine temperature and closing when the engine is cold and energizing said solenoid coil to deenergize said blower and hold said blower motor deenergized until opening of said temperature sensitive switch upon elevated coolant temperature conditions.

16. The automatic temperature control system of claim 15, including,
two servo motors connected in parallel,
a fresh air door operated by one of said motors,
a recirculating air door operated by the other of said motors alternately of operation of said fresh air door,
wherein the relay is an electro-vacuum relay,
wherein a vacuum connection is provided from source vacuum to said relay and another vacuum connection is provided from said relay to said two power servo vacuum motors in parallel, for effecting closing of said recirculation door and opening of said fresh air door upon energization of said solenoid coil.

17. The automatic temperature control system of claim 16, in which the parallel vacuum connection from said electro-vacuum relay to said vacuum motors includes,
a vacuum input having vacuum connection with said two motors,
a bleed passage bleeding vacuum connected with said vacuum input and delaying closing of said recirculation door and opening of said fresh air door for a predetermined time interval when the engine is cold, to accommodate the purging of stored air prior to the circulation of fresh air into the passenger compartment of the vehicle.

18. The automatic temperature control system of claim 16, including,
a time delay switch operate by said servo motor closing said recirculation door and closed upon closing of said door, to complete a circuit from said relay to said programmer,
and an electrical connection directly connecting said relay to said blower motor through said resistors for energizing said blower motor at a low speed to purge the system for a predetermined time interval during engine warm-up.

* * * * *